(12) United States Patent
Lundström

(10) Patent No.: US 7,996,504 B2
(45) Date of Patent: Aug. 9, 2011

(54) IP BASED SIGNALLING NETWORKS

(75) Inventor: Johan Lundström, Pargas (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1633 days.

(21) Appl. No.: 10/595,000

(22) PCT Filed: Jun. 18, 2003

(86) PCT No.: PCT/EP03/50233
§ 371 (c)(1), (2), (4) Date: Dec. 1, 2005

(87) PCT Pub. No.: WO2005/004411
PCT Pub. Date: Jan. 13, 2005

(65) Prior Publication Data
US 2007/0220166 A1    Sep. 20, 2007

(51) Int. Cl.
*G06F 15/16* (2006.01)
(52) U.S. Cl. ........................ 709/223; 709/245
(58) Field of Classification Search .................... 709/221
See application file for complete search history.

(56) References Cited

U.S. PATENT DOCUMENTS

| | | | |
|---|---|---|---|
| 5,732,072 A | | 3/1998 | Weber et al. |
| 6,985,454 B1 * | | 1/2006 | Wiedeman et al. ............ 370/316 |
| 7,388,869 B2 * | | 6/2008 | Butehorn et al. ............. 370/401 |
| 2004/0008735 A1 * | | 1/2004 | Gilchrist et al. ............. 370/522 |

OTHER PUBLICATIONS

Stewart, Ramalho et al: "Stream Control Transmission (SCTP) Dynamic Address Reconfiguration" IETF Draft Network Working Group, [Online] Feb. 26, 2003, XP002261947 Retrieved from the Internet: URL: www.ietf.org> [retrieved on Nov. 18, 2003] p. 8, paragraph 3.2.1.ADD.IP.ADDRESS; p. 9, paragraph 3.2.2.DELETE.IP.ADDRESS.

* cited by examiner

*Primary Examiner* — Tammy T Nguyen

(57) ABSTRACT

A method of updating routing tables stored at a multiplicity of Signaling End Points (SEPs) of an SS7 over IP signaling network following the introduction of a new SEP into the network. The new SEP sends a message to an existing SEP, the message identifying an IP address and SS7 address(es) of the new SEP. The existing SEP adds the IP address and SS7 address(es) of the new SEP to the routing table(s) stored at the existing SEP, and forwards the message to other SEPs identified in the routing table(s) at the existing SEP. The other SEPs add the IP address and SS7 address(es) of the new SEP to their routing tables. Each SEP that receives the message sends a response message to the new SEP containing the IP and SS7 addresses of the responding SEP, and the new SEP populates its routing table(s) using the contents of the response messages.

7 Claims, 2 Drawing Sheets

IP BASED SIGNALLING NETWORKS

FIELD OF THE INVENTION

The present invention relates to IP based signalling networks and more particularly to IP based signalling networks designed to transport SS7 signalling.

BACKGROUND TO THE INVENTION

Modern telecommunication networks make use of a set of signalling protocols known collectively as SS7 to set up and control calls. SS7 messages are exchanged between so-called Signalling End Points which may be, for example, local exchanges of a Public Switched Telephone Network (PSTN), Mobile Switching Centres (MSCs) of a GSM network, or Radio Network Controllers of a UMTS (3G) Radio Access Network. SEPs are identified by unique Signalling Point Codes (PC) which act as addresses within the SS7 network. Other network nodes may also be allocated unique PCs to allow SS7 signals to be routed to these nodes.

Setting up or changing a traditional SS7 based signalling network is a laborious task involving the dimensioning and defining of links, link-sets, routes, route-sets, routing data, etc. This needs to be done in every node, which is part of the network. To avoid a full-mesh, which would be very expensive from both an administrative and transmission network point of view, traditional SS7 signalling networks have been built according to a hierarchical network structure. This structure is illustrated in FIG. 1. Every Signalling End Point (SEP) has usually been connected to a pair of Signalling Transfer Points (STPs). This solution has allowed the SEPs to have only limited knowledge about other SEPs and their location in the network. The STPs have been the points in the network where the network structure has been known, which has allowed the STPs to do the routing of signalling messages between SEPs.

Within an SS7 network routing can be based on a destination PC (and optionally a subsystem number (SSN)). When a destination PC/SSN is provided for a signal, each participating node (e.g., switches, STPs, SCPs, etc.) within the serving network must have data identifying the specified destination PC/SSN. Therefore, whenever a signal is received with a particular destination PC/SSN, each transferring node within the serving network knows exactly where to send the signal.

Signals can also be routed using global title (GT) numbers. When the node originating a signal does not know the destination PC associated with a particular destination node, a global title number has to be used for routing purposes. That global title number is translated into an "intermediate" PC which identifies the next known step. Translation is a two step process involving a first translation from the global title number to a global title routing case (GTRC) using a GT table, and a second translation from a GTRC to a PC using a GTRC table. Each transfer node connecting the originating node with the destination node performs a similar global title number translation to identify the next step. Each node knows only to forward a received signal with a particular global title number toward a certain network or direction. Of course, at some point on the journey of the signal, a correct destination PC has to be provided so that the signal can reach its final destination. Thus, all of the STPs within a given network must include up-to-date information (i.e. GT and GTRC tables) correlating global title numbers with specific PC information. In some implementations, the GT and GTRC tables may be merged into a single "routing" table.

The standardisation organisation Internet Engineering Task Force (IETF) has formed a working group known as Signal Transport (SIGTRAN) to formulate and implement the specifications necessary for transporting SS7 signalling over an IP network. SIGTRAN based signalling networks are expected to be introduced commercially over the next few years. IP based signalling has a number of advantages including increased network capacity and reduced infrastructure and maintenance costs.

The structure of a SIGTRAN based signalling network resembles on the logical level a full mesh (although the physical network may be of another structure, e.g. an SDH ring). This structure is illustrated in FIG. 2. There is no equivalent of the SS7 STP node and instead every SEP communicates on the logical level directly with every other SEP. The reason STPs are not needed is because routing is done at the IP level, thus allowing the physical and the logical networks to be different. (Some vendors may choose to include IP/STP nodes in SIGTRAN network, the STP nodes performing routing based upon SS7 addresses.)

One drawback of the SIGTRAN network, especially if the network consists of many nodes, is the fact that every SEP needs to have an SCCP GT/GTRC routing table(s) and a further IP address table mapping destination PCs to IP addresses (although again these tables may be merged into a single table or demerged into additional linked tables). Thus, a SEP needs to know the IP address (or addresses as an STP may "posses" multiple IP addresses to provide a degree of redundancy) of nearly every other SEP in the network. Maintaining these address tables, especially in situations when the network is growing rapidly (as will be the case in the years immediately following the first introduction of SIGTRAN), will be very expensive for the operator. Changing the IP address(es) of a SEP manually would also be difficult or even impossible in practice due to the major reconfiguration of the rest of the signalling network that this would require.

Even with today's SS7 networks, operators would like to reduce operating costs which are high due to the need to maintain the large global title and PC routing tables. If network management costs were to increase further with the introduction of SIGTRAN networks, many operators may not find SIGTRAN to be a feasible alternative.

The following are concerned with distributing routing information in the data plane: WO 200207331; The 'Hello protocol' described in the OSPF protocol (e.g. *RFC* 1247 July 1991); The ATM Forum P-NNI spec, para 5.6.

SUMMARY OF THE INVENTION

According to a first aspect of the present invention there is provided a method of updating routing tables stored at a multiplicity of Signalling End Points of an SS7 over IP signalling network following the introduction of a new Signalling End Point into the network, the method comprising:

sending a message from the new Signalling End Point to an existing Signalling End Point, the message identifying an IP address and SS7 address(es) of the new Signalling End Point;

updating the routing table(s) stored at said existing Signalling End Point with the new address information;

forwarding said message from said existing Signalling End Point to other Signalling End Points identified in the routing table(s) at said existing Signalling End Point; and updating the routing tables at said other Signalling End Points upon receipt of said messages.

Embodiments of the present invention allow new Signalling End Points to be implemented in a "plug and play" format. That is to say that it is not necessary to either program a new Signalling End Point with address information for all existing network nodes, or to manually update the routing tables of those other Signalling End Points with address information of the new Signalling End Point. The "automatic" nature of the present can also be expected to make the SIGTRAN network more reliable as faults made by human staff may be avoided.

Said multiplicity of Signalling End Points need not comprise all of the Signalling End Points of an SS7 over IP signalling network. Upon the introduction of a new Signalling End Point, those Signalling End Points which are not one of said multiplicity may have their routing tables updated by some other means, e.g. manually. The routing table(s) of the new Signalling End Point may also be updated manually for those Signalling End Points.

Preferably, upon receipt of said message at a Signalling End Point, that Signalling End Point sends a response message to the new Signalling End Point containing the IP and SS7 addresses of the responding Signalling End Point. The new Signalling End Point populates its routing table(s) using the contents of the response messages.

Preferably, said SS7 addresses of the new Signalling End Point are SS7 Signalling point codes and Global Titles. Signalling End Points comprise Signalling Connection and Control Part (SCCP) Global Title Translation tables and Destination Signalling point code tables.

Preferably, said new Signalling End Point is preconfigured with IP and SS7 address information for itself and for said existing Signalling End Point.

The message sent from the new Signalling End Point to an existing Signalling End Point may contain multiple IP addresses for the new Signalling End Point, e.g. a primary address and one or more secondary addresses.

According to a second aspect of the present invention there is provided a method of updating routing tables stored at a multiplicity of Signalling End Points of an SS7 over IP signalling network to reflect the deletion of a Signalling End Point from the network, the method comprising:

sending a message from the Signalling End Point to be deleted to other Signalling End Points identified in the routing table(s) of that said Signalling End Point; and updating the routing tables at said other Signalling End Points upon receipt of said message.

According to a third aspect of the present invention there is provided a method of updating routing tables stored at a multiplicity of Signalling End Points of an SS7 over IP signalling network to reflect changes in address data at a given Signalling End Point, the method comprising:

sending a message from said given Signalling End Point to other Signalling End Points identified in the routing table of said given Signalling End Point, notifying the other Signalling End Points that the entry for given Signalling End Point is to be deleted from routing tables of the other Signalling End Points;

in response to receipt of said message at each other Signalling End Point, deleting data for said given Signalling End Point from the routing table(s); and carrying out the method of the first aspect of the present invention, said messages associated with that method containing the new address data.

According to a fourth aspect of the present invention there is provided a signalling end point for use in an SS7 over IP signalling network, the signalling end point comprising:

a memory for storing one or more routing tables mapping IP addresses to SS7 address data for other signalling end points of the signalling network;

processing and transmission means for sending a message to an existing Signalling End Point when the first mentioned signalling end point is introduced into the signalling network, wherein the existing signalling end point can forward the message to other signalling end points known to it; and input and processing means for receiving response messages from other signalling end points, each containing an IP address and SS7 address data for the responding signalling end point, and for adding this information to the routing table(s) stored in said memory.

DETAILED DESCRIPTION OF CERTAIN EMBODIMENTS

Figure 1:
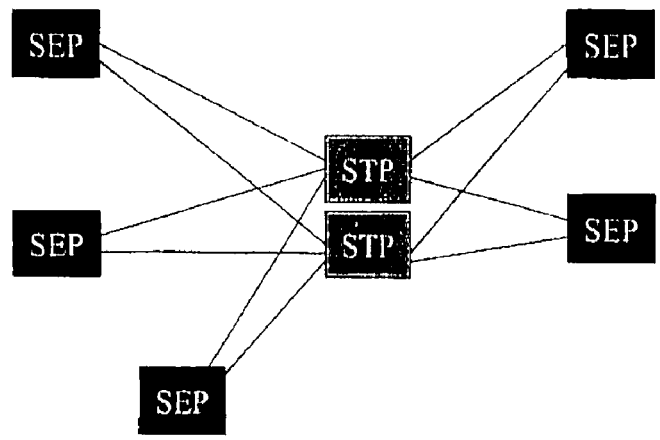
FIG. 1 illustrates schematically the architecture of a conventional SS7 signalling network.
Figure 2:
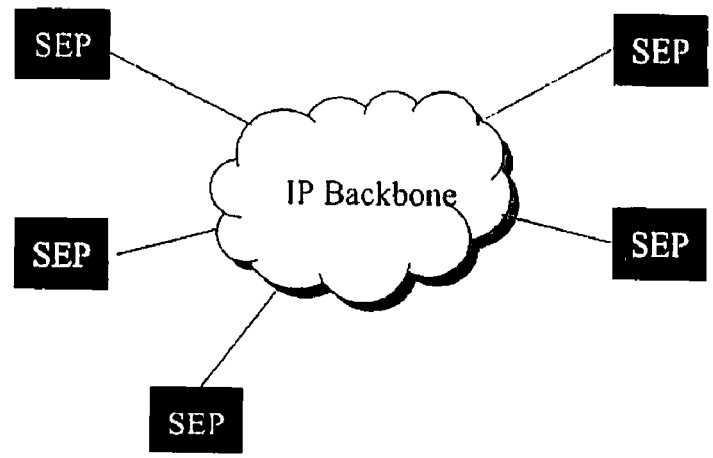
FIG. 2 illustrates schematically the architecture of a SIGTRAN signalling network.
Figure 3:
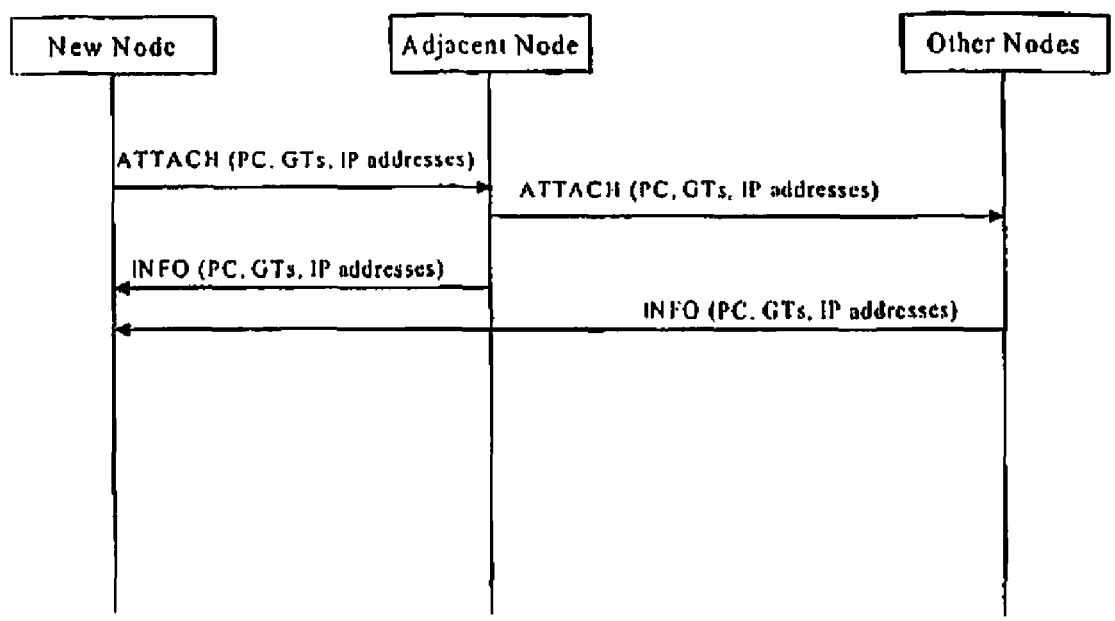
FIG. 3 illustrates signaling associated with the introduction of a new signaling end point into the SIGTRAN network of FIG. 2, in accordance with a preferred embodiment of the present invention.

In order to implement a "Plug & Play" SIGTRAN network, a mechanism is needed which allows nodes, for example signalling end points (SEPs), to automatically configure their routing tables and establish links (=SCTP Associations) to other nodes. This can be achieved by creating a virtual network, which would be used for administrative purposes. In such a virtual network every node in the network is aware of all other nodes in the network, i.e. every node knows about the IP address(es), Signalling point code and Global Title(s) of all other nodes. When a new node is attached to the network, the operator enters that node's own IP address(es), Signalling point code and Global Title(s) in the node's routing tables. Additionally, the operator sets up the IP address of one other (adjacent) node in the network. This allows the new node to send its address information to the adjacent node, which then distributes the address information for the new node to all other nodes in the network and which are identified in the routing tables of that adjacent node. When a node in the network receives information about a new node in the network, it updates its own routing tables with the address information and sends it's own address information to the new node using the received IP address. The signalling associated with this procedure is illustrated in FIG. 3.

If a node is to be removed (permanently or temporarily) from the SIGTRAN network, the node sends a detach message to all nodes in the network. In case the signalling point code or the IP address(es) of a node needs to be changed, the node is removed and introduced again with the new information. If a new Global Title needs to be introduced, this Global Title is sent to all the nodes in the network by the node in which the new Global Title is introduced.

When SIGTRAN networks are first introduced into the "field", it is inevitable that there will be a large number of legacy (TDM or ATM based) SS7 nodes. The communication with these nodes will be handled via Signalling Gateways (or interworking functions). If a Signalling Gateway is part of a virtual network as described above, it needs to attach all signalling point codes and Global Titles of the legacy nodes to the virtual network. The unique IP addresses of the Signalling Gateway will however indicate implicitly to the other nodes in the network that the Signalling Gateway has introduced several signalling point codes, thus allowing the other nodes to establish only one SCTP association each to the Signalling Gateway. In the case of Signalling Gateways, a Gateway acts as a "proxy" for attached Signalling End Points, sending attach and detach messages to other Signalling End Points (or their Signalling Gateways) on their behalf.

When a new application is introduced into a node, the basic SS7 infrastructure is already in place, which allows the application to specify which of the nodes in the network it wants to communicate with. This allows the node where the application is introduced to automatically establish an SCTP association to every node to which the application needs to communicate with.

In a practical implementation, it may be that automatic configuration only happens for nodes belonging to a given national network. Links between networks can still be administered manually, as the number of connections between networks is likely to be limited to a relatively small number.

The inventive concept described here can be implemented in only a subset of all of the nodes in a given network. Other nodes, not implementing the inventive concept, can be updated manually. Even where only say 50% of the nodes in a given network implement the invention, there would still be significant savings.

It will be appreciated by the person of skill in the art that various modifications may be made to the above described embodiments without departing from the scope of the present invention. For example, a new Signalling End Point may be configured with the address information of a secondary or back-up existing Signalling End Point to which the update message is sent if the primary Signalling End Point cannot be reached. In another modification, a new Signalling End Point may start a timer following the sending of an update message. If responses from other Signalling End Points are not received prior to expiry of the timer, the message may be resent, e.g. to the same or another existing Signalling End Point. In yet another modification, a Signalling End Point may "refresh" the network by resending an update message either automatically (e.g. once per day) or upon receiving an appropriate command.

In the event that a SIGTRAN network comprises IP/STP nodes, an update message for a new Signalling End Point may be sent to an existing STP rather than to an existing Signalling End Point. The STP may have to modify the message before passing it on to other Signalling End Points or STPs, e.g. to specify the STP as a destination point for messages destined for the new Signalling End Point.

Signalling End Points may be arranged to store routing tables in a variety of formats. Routing tables may be provided to map destination Point Codes to IP addresses and/or Global Titles to Global Title Routing Cases and Global Title Routing Cases to Point Codes. In the SIGTRAN implementation known as SUA, signalling Point Codes are not used. In this case, the routing table may map Global Titles directly to IP addresses. Other routing table configurations are also envisaged.

The invention claimed is:

1. A method of updating routing tables stored at a multiplicity of Signalling End Points of an SS7 over IP signalling network following the introduction of a new Signalling End Point into the network, the method comprising:

sending a message from the new Signalling End Point to an existing Signalling End Point, the message identifying an IP address and SS7 address(es) of the new Signalling End Point;

updating the routing table(s) stored at said existing Signalling End Point by adding the IP address and SS7 address(es) of the new Signalling End Point to the routing table(s) stored at the existing Signalling End Point;

forwarding said message from said existing Signalling End Point to other Signalling End Points identified in the routing table(s) at said existing Signalling End Point;

updating the routing tables at said other Signalling End Points upon receipt of said messages by adding the IP address and SS7 address(es) of the new Signalling End Point to the routing table(s) stored at each of the other Signalling End Points;

sending from each Signalling End Point that receives the message, a response message to the new Signalling End Point containing the IP and SS7 addresses of the responding Signalling End Point; and the new Signalling End Point populating its routing table(s) using the contents of the response messages.

2. The method according to claim 1, wherein said multiplicity of Signalling End Points does not comprise all of the Signalling End Points of the SS7 over IP signalling network.

3. The method according to claim 1, wherein said SS7 addresses of the new Signalling End Point are SS7 Signalling point codes and Global Titles and optionally Sub-System Numbers.

4. The method according to claim 3, wherein said Signalling End Points comprise Signalling Connection and Control Part (SCCP) Global Title Translation tables and Destination Signalling point code tables.

5. The method according to claim 4, wherein said new Signalling End Point is preconfigured with IP and SS7 address information for itself and for said existing Signalling End Point.

6. A method of updating routing tables stored at a multiplicity of Signalling End Points of an SS7 over IP signalling network to reflect changes in address data at a given Signalling End Point, the method comprising:

sending a message from said given Signalling End Point to other Signalling End Points identified in the routing table of said given Signalling End Point, notifying the other Signalling End Points of the changes in the address data at the given Signalling End Point;

in response to receipt of said message at each receiving Signalling End Point:

updating routing table(s) stored at the receiving Signalling End Point to reflect the changes in the address data for said given Signalling End Point; and forwarding the message to further Signalling End Points identified in the routing table of the receiving Signalling End Point, notifying the further Signalling End Points of the changes in the address data for the given Signalling End Point; and updating the routing tables at the further Signalling End Points upon receipt of the messages by modifying the IP address and SS7 address(es) of the given Signalling End Point stored at each of the further Signalling End Points.

7. A Signalling End Point being added to an SS7 over IP signalling network, the added Signalling End Point comprising:

a memory for storing one or more routing tables mapping IP addresses to SS7 address data for other Signalling End Points of the signalling network;

processing and transmission means for sending a message to an existing Signalling End Point when the added Signalling End Point is introduced into the signalling network, the message identifying an IP address and SS7 address(es) of the added Signalling End Point, wherein the existing Signalling End Point forwards the message to other Signalling End Points known to it, and the existing Signalling End Point and the other Signalling End Points update their respective routing tables upon receipt of the messages by adding the IP address and SS7 address(es) of the added Signalling End Point to the routing table(s) stored at each of the Signalling End Points; and input and processing means for receiving response messages from the existing Signalling End Point and the other Signalling End Points, each response message containing an IP address and SS7 address for the responding Signalling End Point; and means for adding the received IP addresses and SS7 addresses to the one or more routing tables stored in said memory of the added Signalling End Point.

* * * * *